(12) United States Patent
Frogget et al.

(10) Patent No.: US 8,711,336 B1
(45) Date of Patent: Apr. 29, 2014

(54) MULTIPOINT PHOTONIC DOPPLER VELOCIMETRY USING OPTICAL LENS ELEMENTS

(71) Applicant: National Security Technologies, LLC., Las Vegas, NV (US)

(72) Inventors: Brent Copely Frogget, Los Alamos, NM (US); Vincent Todd Romero, Los Alamos, NM (US)

(73) Assignee: National Security Technologies, LLC, Las Vegas, NV (US)

( * ) Notice: Subject to any disclaimer, the term of this patent is extended or adjusted under 35 U.S.C. 154(b) by 0 days.

(21) Appl. No.: 13/666,953

(22) Filed: Nov. 1, 2012

(51) Int. Cl.
*G01P 3/36* (2006.01)

(52) U.S. Cl.
USPC .......................................................... 356/27

(58) Field of Classification Search
USPC ........ 385/2, 33, 72, 78; 356/27, 924, 39, 502, 356/29, 28, 28.5
See application file for complete search history.

(56) References Cited

U.S. PATENT DOCUMENTS

| | | | |
|---|---|---|---|
| 4,166,695 A | | 9/1979 | Hill et al. |
| 4,346,991 A | | 8/1982 | Gardner et al. |
| 4,902,888 A | | 2/1990 | Kondo |
| 5,013,928 A | | 5/1991 | Ikeda et al. |
| 5,483,332 A | | 1/1996 | Takamiya et al. |
| 5,587,785 A | * | 12/1996 | Kato et al. .................... 356/28.5 |
| 5,812,250 A | | 9/1998 | Ishida et al. |
| 6,075,600 A | * | 6/2000 | Nagano et al. ................ 356/482 |
| 6,542,226 B1 | | 4/2003 | Wernet |
| 8,120,757 B2 | | 2/2012 | Dede et al. |
| 2003/0231829 A1 | * | 12/2003 | Meyers et al. .................. 385/33 |
| 2007/0156021 A1 | | 7/2007 | Morse et al. |

OTHER PUBLICATIONS

G. K. Mukherjee. "Studies of the wind filtering effect of gravity waves observed at Allahabad (25.45○N, 81.85○E) in India" Mar. 4, 2010.*

* cited by examiner

*Primary Examiner* — Gregory J Toatley
*Assistant Examiner* — Maurice Smith
(74) *Attorney, Agent, or Firm* — Weide & Miller, Ltd.

(57) ABSTRACT

A probe including a fisheye lens is disclosed to measure the velocity distribution of a moving surface along many lines of sight. Laser light, directed to the surface and then reflected back from the surface, is Doppler shifted by the moving surface, collected into fisheye lens, and then directed to detection equipment through optic fibers. The received light is mixed with reference laser light and using photonic Doppler velocimetry, a continuous time record of the surface movement is obtained. An array of single-mode optical fibers provides an optic signal to an index-matching lens and eventually to a fisheye lens. The fiber array flat polished and coupled to the index-matching lens using index-matching gel. Numerous fibers in a fiber array project numerous rays through the fisheye lens which in turn project many measurement points at numerous different locations to establish surface coverage over a hemispherical shape with very little crosstalk.

20 Claims, 8 Drawing Sheets

MULTIPOINT PHOTONIC DOPPLER VELOCIMETRY USING OPTICAL LENS ELEMENTS

1. STATEMENT REGARDING FEDERAL RIGHTS

This invention was made with government support under Contract No. DE-AC52-06NA25946 and was awarded by the U.S. Department of Energy, National Nuclear Security Administration. The government has certain rights in the invention.

2. FIELD OF THE INVENTION

This invention relates to photonic Doppler velocimetry and in particular to a method and apparatus for multipoint photonic Doppler velocimetry using optical lens elements.

3. RELATED ART

Photonic Doppler velocimetry (PDV) can be used to monitor movement of a curved surface that is moving along multiple points, such as during an experiment. The movement of the curved surface may occur due to an implosion, explosion, or any other force or factor that causes movement of the surface. Such movement often occurs during dynamic material experiments. These dynamic material experiments frequently involve complicated geometries and therefore large numbers of data points are a distinct advantage. Various solutions have been proposed to record the movement of the surface, but each of these various solutions suffer from various drawbacks.

One proposed prior art solution for measurement of the moving curved surface is the use of electrical shorting pins. In such a configuration, electrical shorting pins of various lengths were used to contact the moving service. An electrical pin provides a shorting signal between the surface and the pin tip when the tip of the pin comes into contact with the moving surface. Each electrical shorting pin gives a single timing point when the collapsing surface contracts the pin. Each length of a pin records one distance, so that many different lengths of pins are needed to follow the movement of an imploding surface. However, longer pins can interfere with the surface movement and interfere with the shorter pins. As a result, data may be corrupted by the interference. In addition, data is only collected by a pin when that pin contacts the moving surface. Movement prior to contact with the pin is not recorded. Moreover, a dense array of pins at many lengths is needed and this density may not be possible to achieve while also achieving desired data recordation.

Several different optical designs have been proposed to measure the behavior of the moving surface. One such proposed solution involved a ball shaped housing with discrete fibers pointed outward toward the surface of interest. This solution provided optic monitoring but it suffered from being size limited. As the number of optic fiber points is increased, this probe eventually comes to its limit in how small the entire group can be made, while still having reasonable optical fiber bending radii. The bend radius of the optic fibers limit size reductions in the probe and there is a limit to the number of fibers which may be packed in the probe.

Therefore, there is a need in the art for an accurate and cost effective light delivery and collection system for use as a collection probe in a PDV system.

SUMMARY

A new fisheye lens design is disclosed for use in probe (which may be any size or miniaturized) to measure the velocity distribution of a moving surface along many lines of sight. An optic signal is directed to the surface using a launching fiber and a fisheye lens. The optic signal may be laser light. The optic signal is scattered back along each beam projected on the surface and is Doppler shifted by the moving surface before being collected into the launching fiber. The received light is mixed with reference laser light in each optical fiber, in a technique called photonic Doppler velocimetry, providing a continuous time record.

An array of single-mode optical fibers sends laser light through the fisheye lens toward the surface. In one embodiment, the lens consists of an index-matching positive element, two positive doublet groups, and two negative singlet elements. The optical design minimizes beam diameters, physical size, and back reflections for excellent signal collection. The fiber array projected through the fisheye lens provides many measurement points of surface coverage over a hemisphere with very little crosstalk. The probe measures surface movement with only a small encroachment into the center of the cavity.

The fiber array is coupled to the index-matching element using index-matching gel. The array is bonded and sealed into a blast tube for ease of assembly and focusing. This configuration also allows the fiber array to be flat polished at a common object plane. In areas where increased measurement point density is desired, the fibers can be close packed. To further increase surface density coverage, smaller diameter cladding optical fibers may be used.

Disclosed herein is a photonic Doppler velocimetry probe comprising a housing defining an interior space between a first end and a second end. One or more optic signal conductors enter the housing through the second end. The optic signal conductors terminate within the interior space of the housing. The one or more optic signal conductors provide one or more optic signals to one or more lenses in the probe. A ferrule, located within the housing, is configured with one or more passages such that the passages receive and secure the one or more optic signal conductors to the ferrule. An index-matching lens is adjacent the ferrule and configured with a flat surface adjacent the ferrule to receive the optic signal. The index-matching lens has an index of refraction selected to match an index of refraction of the optic signal conductors. Also part of this embodiment is a fish eye lens, mounted at the first end, configured to receive the optic signal and project the optic signal outward, in a direction controlled by the configuration of the fish eye lens.

In one embodiment, the one or more optic signal conductors are optic fibers. The optic fibers may be single mode optic fibers. It is contemplated that the terminating end of the one or more optic fibers and a side of the ferrule are end-polished. The probe may further comprise an index-matching material between the index-matching lens and the ferrule such that the index-matching material consists of index-matching gel or index-matching epoxy. The optic signal may be at 1550 nm wavelength. The probe may also include one or more additional lens elements between the index-matching element and the fisheye lens. In one embodiment, the fisheye lens, index-matching lens, and the optic signal conductors are configured to receive a reflection of the optic signal and conduct the reflection back through the optic signal conductor.

The photonic Doppler velocimetry probe may be configured as a housing defining an interior space and one or more optic signal conductors having a terminating end configured to provide optic signals near or within the housing. The optic signal conductors may be fiber optic cables. Also part of this embodiment is an index-matching lens, located in the interior space, configured to receive the optic signals. The index-matching lens may have an index of refraction selected to match an index of refraction of the one or more optic signal conductors. A fisheye lens is provided and configured to receive the optic signals after the optic signals pass through the index-matching lens. The fisheye lens projects the optic signal outward, in a direction controlled by the configuration of the fish eye lens onto a curved surface that is the subject of photonic Doppler velocimetry measurement.

In one configuration optic signal conductors are optic fibers, which may be single mode optic fibers. The optic signal conductors may be secured by a disk having one or more passages. The optic signal conductors may pass through the passages and be end-polished flat with a side of the disk faxing the index-matching lens. In one embodiment, the probe further comprises an index-matching gel material between the index-matching lens and the one or more optic signal conductors. There may be one or more additional lens elements between the index-matching element and the fisheye lens. In one configuration, the fisheye lens, the index-matching lens and the optic signal conductors are configured to receive a reflection of the optic signal and conduct the reflection back through the optic signal conductor to measurement equipment.

Also disclosed is a method for use during photonic Doppler velocimetry, for presenting an optic signal to a curved surface and receiving a reflection from the curved surface during movement of the curved surface. This method includes establishing a distal end of a probe facing the curved surface such that the distal end of the probe includes a fisheye lens facing the curved surface. Then, generating an optic signal and presenting the optic signal to an optic signal conductor. This method then passes the optic signal through the optic signal conductor to one or more lenses. The one or more lens includes an index matched lens. This method directs the optic signal into a fisheye lens such that the fisheye lens changes the path of the optic signal to thereby project the optic signal onto a position on the curved surface. At this stage, movement of the curved surface is initiated and the fisheye lens receives a reflection of the optic signal. The reflection passes through the lenses to the optic signal conductor.

In one embodiment, the optic signal conductor is a single mode fiber optic cable. It is contemplated that the reflection will proceed along the same path through the fisheye lens, through the one or more lenses, and into the optic signal conductor as the optic signal. The step of projecting may comprise projecting the optic signal onto a position on the curved surface.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Photonic Doppler velocimetry (PDV) with a novel light signal path is utilized to measure movement of a curved surface. PDV uses light scattered and reflected from a moving surface to continuously measure the movement of that surface. This method takes advantages of the Doppler principles. Namely, the Doppler-shifted light from the moving surface is compared to unshifted light to create fringes in a Michelson interferometer made up of fiber-optic components. Then, a fiber-optic circulator is used as the beam splitter of the interferometer. Reference (unshifted) light is provided through mixing with an external reference laser source or from back reflections in the probe itself. Surface velocities of between a few millimeters per second up to 14 km/s have been measured and it is expected that further development will allow operation at higher velocities. A PDV probe lens or bare fiber can both transmit and receive the laser light. In the embodiment disclosed herein a 1550 nm telecommunications wavelength, continuous-wave (CW) fiber laser is used with matching fiber, fiber related devices, optic detectors, and signal digitizers.

Figure 1:
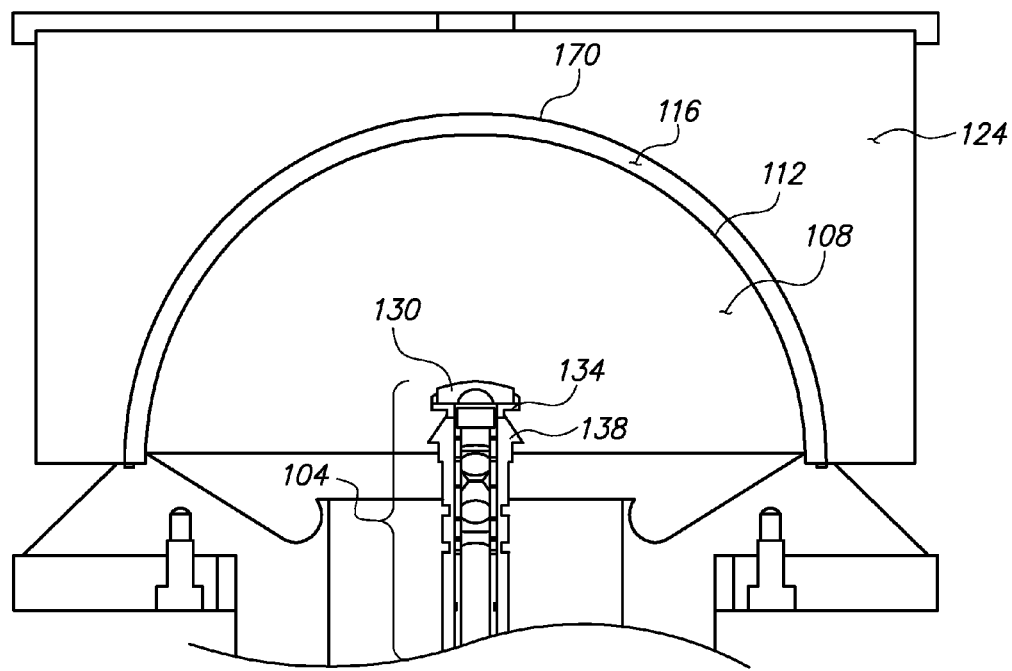
FIG. 1 illustrates a side view of an exemplary environment of use of the probe disclosed herein.

As discussed above, drawbacks exist in the prior art with the probe that is used to present the light signal to the moving surface and collect the light signal from the moving surface. The probe structure and associated light path disclosed herein overcomes those drawbacks. FIG. 1 illustrates a side view of an exemplary environment of use of the probe disclosed herein. This is but one possible environment of use and as such it is contemplated that other uses for the disclosed system may be arrived at by one of ordinary skill in the art.

As shown in FIG. 1, the probe assembly 104 is provided in the interior space 108 that is bounded by a curved interior surface 112 of a structure 116. The structure 116 is surrounded on an exterior surface 120 by a material 124. The material 124 may comprise any material that exerts a force on the surface 120 to thereby move the material 116 inward toward the probe assembly 104. In one embodiment, the material 124 comprises an explosive material that when detonated, implodes the interior surface 112 inward toward the probe assembly 104.

In other embodiments, it is contemplated that a material 124 other than explosives may be utilized such as, but not limited to heat, air pressure, liquid pressure, radiation, or any other type of force. The material 116 may comprise any type material or barrier. The interior area 108 may comprise any type material or void including but not limited to, a vacuum, air or other gas, or even other material, such as gel or liquid, or a solid compressible material.

It is also contemplated that the interior surface 112 may move outward, away from the probe assembly 104 instead of inward toward the probe assembly. In other embodiments, the surface may move in a non-uniform manner with a first portion of the surface 116 moving toward the probe assembly 104 and a second part of the surface moving away from the probe assembly.

On the exterior of the probe assembly 104 is an exterior lens 130 which rests in a support 134. Below the exterior lens 130 are one or more lens, discussed below in greater detail, which are contained in a housing 138. In one embodiment, the exterior lens is a fisheye lens. A fisheye lens provides an ability to image over a very wide range of angles using optic signals which enter the lens from a single direction, such as through a planar surface. Likewise, reflections into the outer surface of a fisheye lens are directed though a single plane on the interior side of the fisheye lens. The 'fisheye' term refers to simulating a large angular view. In one configuration, this lens type produces a whole-sky or whole-view image as a finite circle. Some fisheye lenses 'see' beyond 180 degrees with darkness beyond it lens limit. In general, a fisheye lens is a wide angle lens that produces strong visual distortion intended to create a wide panoramic or hemispherical image. Fisheye lenses achieve extremely wide angles of view by forgoing producing images with straight lines of perspective (rectilinear images), opting instead for a special mapping (for example: equisolid angle), which gives images a characteristic convex non-rectilinear appearance. In various different embodiments the term fisheye lens includes a circular fisheye lens, a full frame fisheye lens, a zoom fisheye lens, a miniature fisheye lens, or any other configuration.

Figure 2:
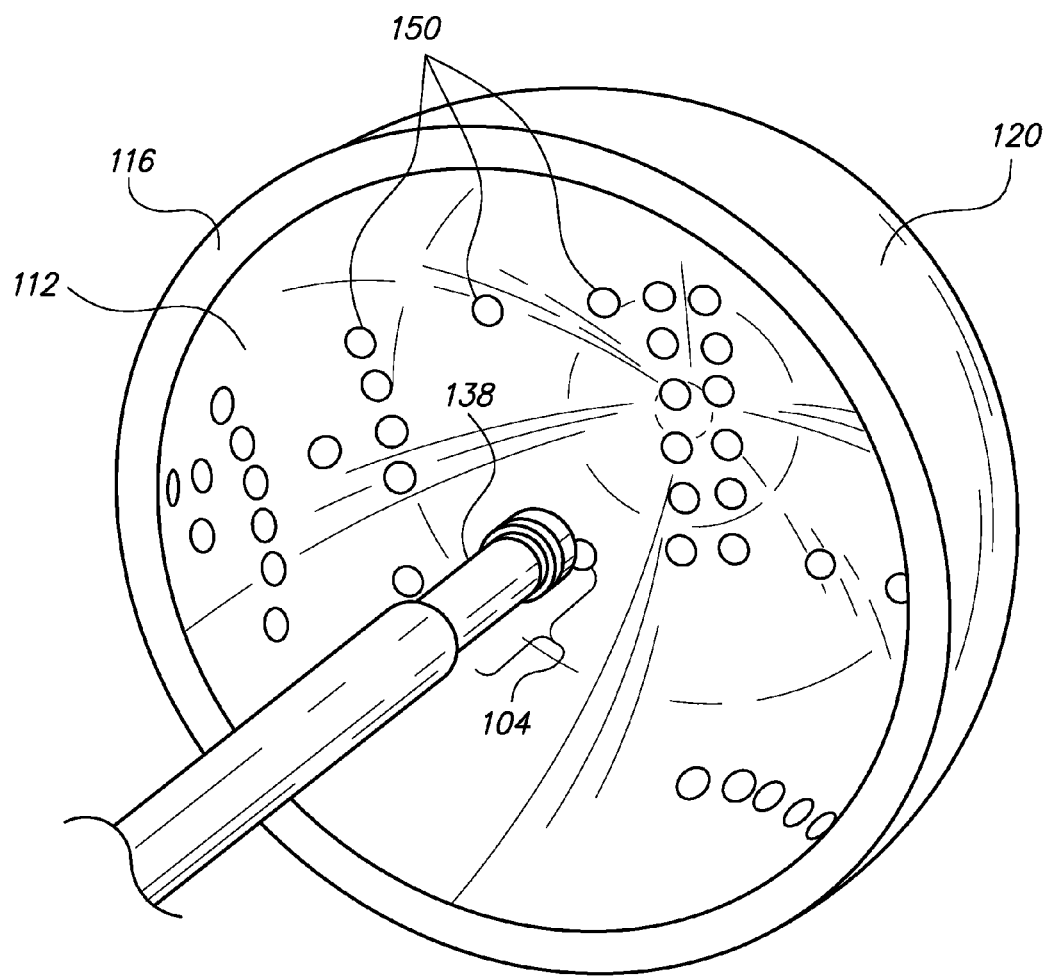
FIG. 2 illustrates a perspective view of the probe assembly 104 and the interior surface.

FIG. 2 illustrates a perspective view of the probe assembly 104 and the interior surface 112. As compared to FIG. 1, similar elements are identified with identical reference numbers. As shown, the housing 138 of probe assembly extends near or into the interior of the structure 116. The exterior lens is at the distal end of the probe structure which faces the interior surface 112. The structure 116 has an interior surface 112 and an outer surface 120 which form a dome or spherical shape. As discussed below in greater detail, the exterior lens (not shown in FIG. 2) projects one or more optic signals on the interior of the inner surface 112. These points of projection are shown by reflection points 150. These projections points 150 may be arranged at any point on the interior surface subject to the monitoring preferences. As discussed below in greater detail, the location of the reflection points is determined by the location of the fiber optic cables and the lenses within the housing 138. This is but one configuration for the surface 112.

Figure 3A:
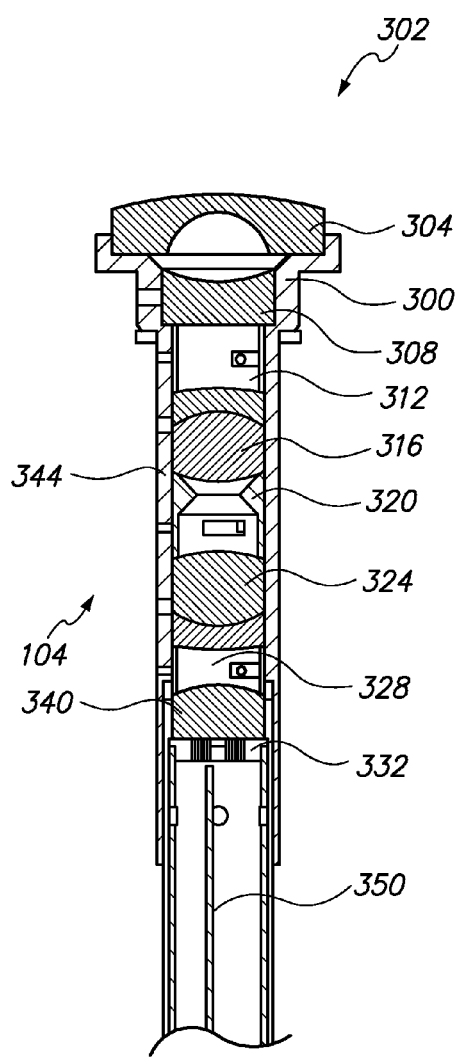
FIG. 3A is a cut away side view of the probe assembly.

Turning to FIG. 3A, a cut away side view of the probe assembly 104 is shown. This is but one possible configuration for the probe assembly and it is contemplated that one of ordinary skill in the art, after reading this disclosure, may arrive at different configurations which do not depart from the claims that follow. In general, the probe assembly 104 includes an outer housing 344 which defines an interior area as shown. While the housing 344 may be of any shape, in this embodiment the housing is cylindrical on its interior surface. As shown, at a distal end 302 of the housing 344 is an exterior lens mount 300 configured to hold or otherwise support an exterior lens 304 which may comprise a fisheye lens. Below the exterior lens 304 are one or more additional lens and open spaces or voids. Although shown in a particular configuration it is contemplated that other arrangements of lens may be arrived at without departing from the scope of the claims that follow. The lens arrangement is configured to convey optic signals from the exterior lens 304 to the interior of the housing 344. The lens disclosed herein may have one or more coatings on the lens which contacts air or the void. These coatings decrease optical reflection, dispersion, and scattering and thereby increase optic signal transmission into and out of the lens. Anti-reflection coatings for glass-to-air interfaces and the use of a minimum of lens elements are important for the operation of the external reference light.

In this example embodiment, opposing the exterior lens 304 is a plano-concave lens 308. Below the plano-concave lens 308 is a space 312 and then a doublet lens 316. Below the doublet lens 316 is an aperture spacer 320 and then another doublet lens 324. Below the doublet lens 324 is a space 328 and below the space 328 is an index matched lens 340. These lenses operate in combination to conduct light signals through the interior of the housing.

Below the index-matching lens 340 is a ferrule 332 configured as a cylindrical disk having a top surface and bottom surface contained by an outer circumferential surface. The ferrule may also be a disk, washer, plate or any other element configured to function as disclosed herein. The ferrule 332 is discussed below in greater detail in connection with FIGS. 4, 5, and 6. The top surface is configured to fit flush with or nearly flush with a bottom surface of the index-matching lens 340. Within the ferrule 332 are one or more cylindrical holes, referred to herein as passages, which pass from the first side to the second side to form a passage. Within the passages are optic signal conductors 350, such as fiber optic cables, optic channels, vacuum, gas, lenses, or any other medium capable of carrying an optic signal. The optic signal conductors 350 have a first end which is adjacent the index-matching lens 340 and second opposing end which interfaces or connects to an optic signal generator and an optic signal detector (not shown).

As an advantage of this configuration over prior art devices, the optic fibers 350 are established and maintained in linear alignment to the planar bottom surface of the index-matching element 340. This alignment maximizes optic signal transmission. In addition, by maintaining a generally linear configuration for the optic fibers, unwanted bending of the optic fibers is avoided. This allows use of thinner optic fibers and a high density of optic fibers as compared to prior art configurations which in turn increases measurement point density.

To maximize transmission of the optic signal between the index matched lens 340 and the optic signal conductors 350, the index matched lens is indexed matched to the optic signal conductor. For example, if the optic signal conductor 304 is an optic fiber then the material of the lens 340 is selected to have the same index of refraction as the fiber optic cable. This minimizes back reflections at the interface between optical fiber ends and the index matched lens. This design may use an index-matching, fused silica lens element in contact with the fibers. The index-matching lens element performs the multiple duties of keeping back reflections low, bending the light to be telecentric out of and into the optical fibers from the rest of the fisheye lens, and flattening the image plane. The index-matching element and optical fiber array can also be adjusted as a unit for fine focusing.

An index-matching gel may be utilized between the index matched lens 340 and the optic signal conductors 350 to further improve index-matching. Other substances may also be utilized at the junction such as index-matching epoxy.

It is contemplated that the lens and ferrule are sized to fit snuggly within the interior of the housing to maintain optical and special alignment between elements. The interior of the housing may also be lined or coated with a material to minimize reflection or light scattering.

Figure 3B:
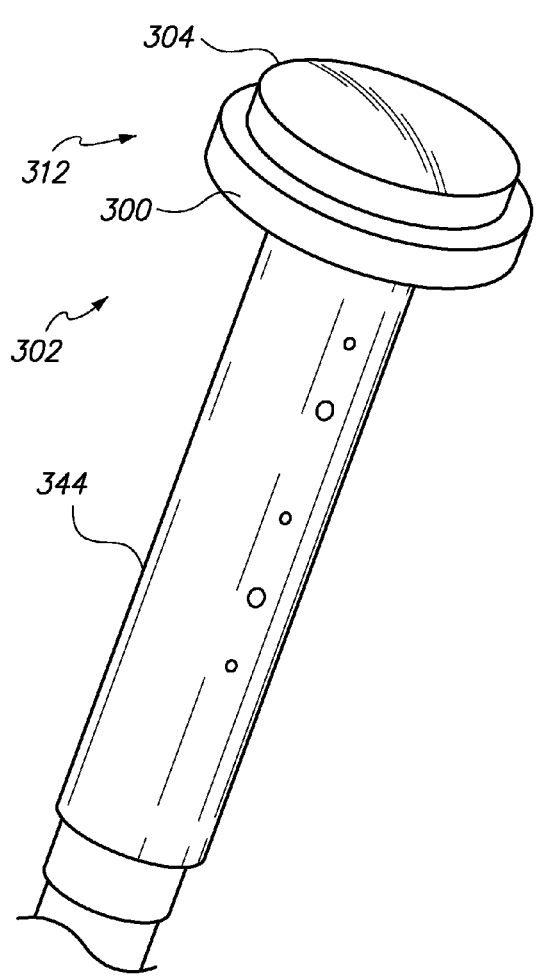
FIG. 3B illustrates a perspective view of the probe assembly shown in FIG. 3A.

FIG. 3B illustrates a perspective view of the probe assembly shown in FIG. 3A. As compared to FIG. 3A, common elements are identified with identical reference numbers. As shown, probe assembly 302 includes the housing 344 having a distal end 312. At the distal end 312 is the exterior lens 304 configured as a fisheye lens or any other lens shape capable of carrying two or more optic signals out of the lens and receiving two or more reflections. Supporting the exterior lens 304 is the lens mount 300.

Figure 4:
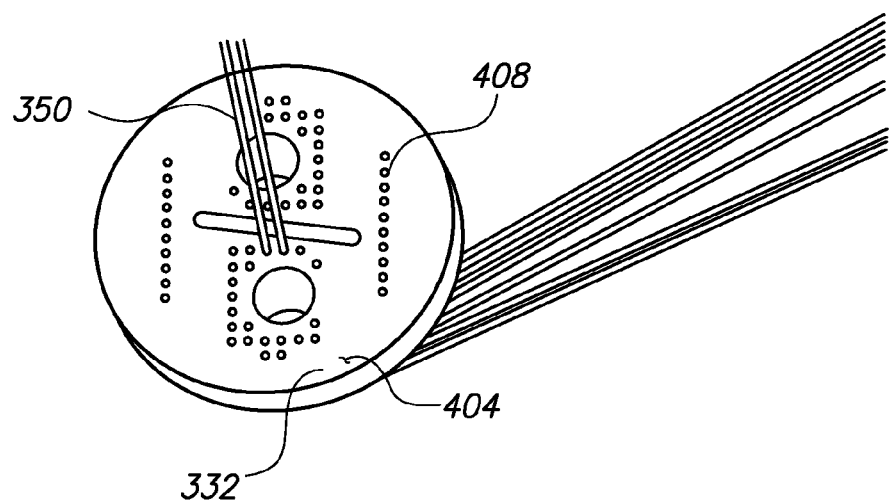
FIG. 4 illustrates a detailed view of a ferrule as shown in element in FIG. 3A.

FIG. 4 illustrates a detailed view of a ferrule as shown in element 332 in FIG. 3A. This is but on possible configuration provided for purposes of discussion. As shown, the ferrule 332 includes a top surface 404 on one or more cylindrical passages 408 between the top surface 404 and the opposing bottom surface (not shown). Any number and arrangement of passages 408 may be established in the ferrule 332. It is also contemplated that the passages 408 may be of various different sizes and shapes as shown to accommodate various different arrangements of optic signal conductors 350 which reside within the passages 408.

In one embodiment, the optic fibers are spatially positioned by being mounted into passages or holes in the optical fiber ferrule 332. The optic fibers are bonded into the ferrule and then the ferrule and optic fibers are polished together. To compensate for imperfections in contact across the fiber ferrule, index-matching gel is added for better coupling at the fiber-to-lens surface. Commercial optical fiber ferrules for MT connectors are made of glass-filled polyphenylene sulfide (PPS) based thermoplastic. Other ferrule material may include PPS, Macor, Vespel, Torlon and Photoveel II. Photoveel II performs well for the micro-hole drilling used to spatially position our single-mode optical fibers. It enables clean, burr-free holes at 125-micron diameter. It also polishes well with the optical fibers. Flat polishing is performed to ensure good coupling with the index-matching element. Photoveel II is a fine-grain, machinable nitride ceramic that is used in the probe card industry. The arrangement of the passages 408 within the ferrule 332 is discussed below in greater detail in connection with FIG. 6.

Figure 5:
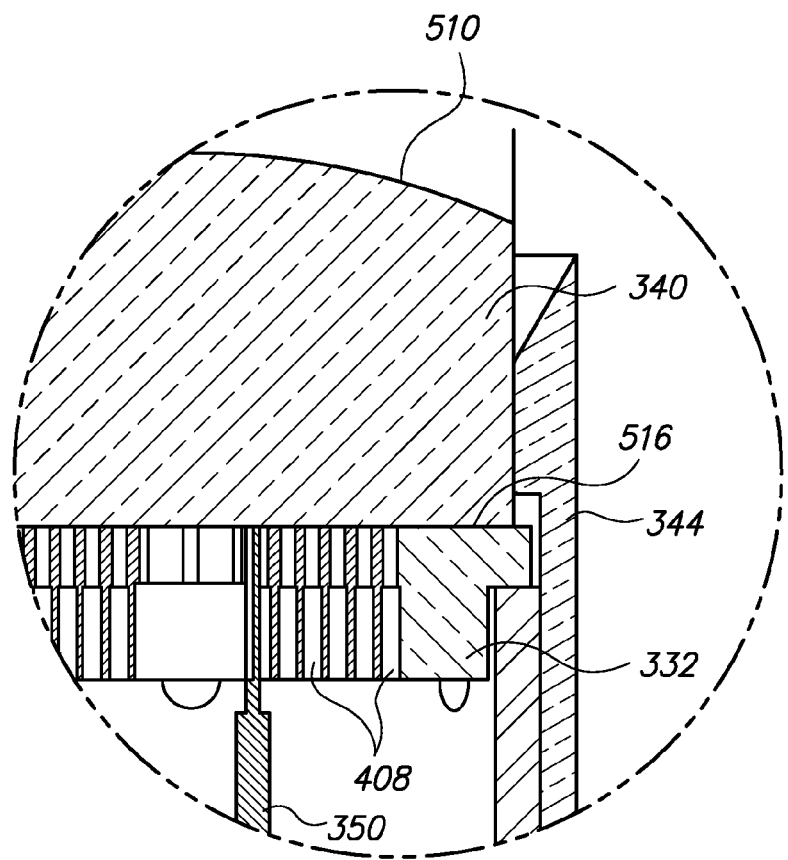
FIG. 5 illustrates an enlarged view of the junction between the index-matching lens and the ferrule.

FIG. 5 illustrates an enlarged view of the junction between the index-matching lens and the ferrule. As shown, the index-matching lens 340 is adjacent the ferrule 332, both of which are contained within the housing 344. The ferrule 332 has one or more passages 408 through which an optic signal conductor 350, such as a fiber optic cable, passes. The index-matching lens 340 has a top surface that is opposite a bottom surface which defines the junction or interface 516 between the index-matching lens 340 and the ferrule 332. At this junction, the index-matching gel or index-matching epoxy may be utilized to reduce refraction, back reflection, and any other index of refraction mismatches. The ends of the optic signal conductor 350 may be flat polished.

Figure 6:
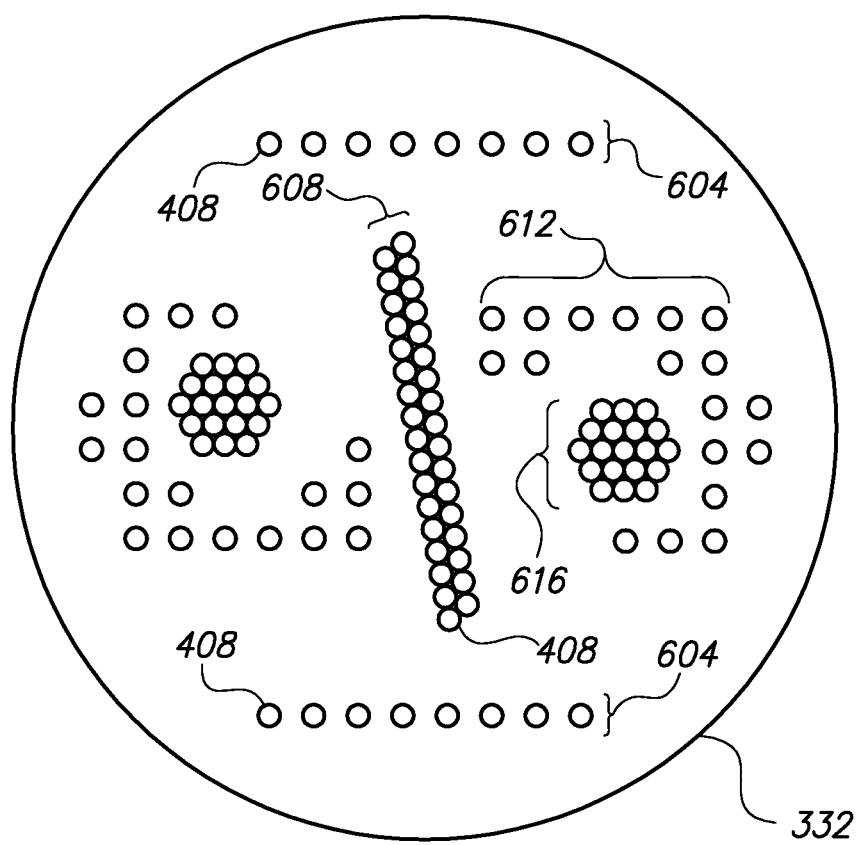
FIG. 6 illustrates an example passage layout within the ferrule.

FIG. 6 illustrates an example passage layout within the ferrule. This lay out also controls the position that the optic signal impacts and exits the fisheye lens. Due to the optic behavior of a fisheye lens, where the optic signal enters the fisheye lens controls where the optics signal exists from the fisheye lens, and consequently where the optic signal will strike the interior surface under measurement. This is but one possible layout arrangement for passages this layout may be modified based on the optic system, the surface to be monitored as part of the PDV process and the desired location of the reflection points on the surface which is being monitored. Referring back to FIG. 2, the reflection points 150 (FIG. 2) are controlled by the location of the passages 408 in the ferrule 332 (and the optic system, which control projection of the optic signals on to the inner surface 112 of FIG. 2).

In this example embodiment, the passages are defined by two generally straight lines 604 of individual passages 408. In the center of the ferrule is an offset linear opening 608 in which numerous adjacent optic signal conductors may be placed as shown within passages 408. Extending outward from the offset linear opening 608 are groups of individual passages 612 and two large openings 616 into which multiple optic signal conductors are placed. The optic signal conductors may be grouped or packed into the larger openings 616.

Figure 7:
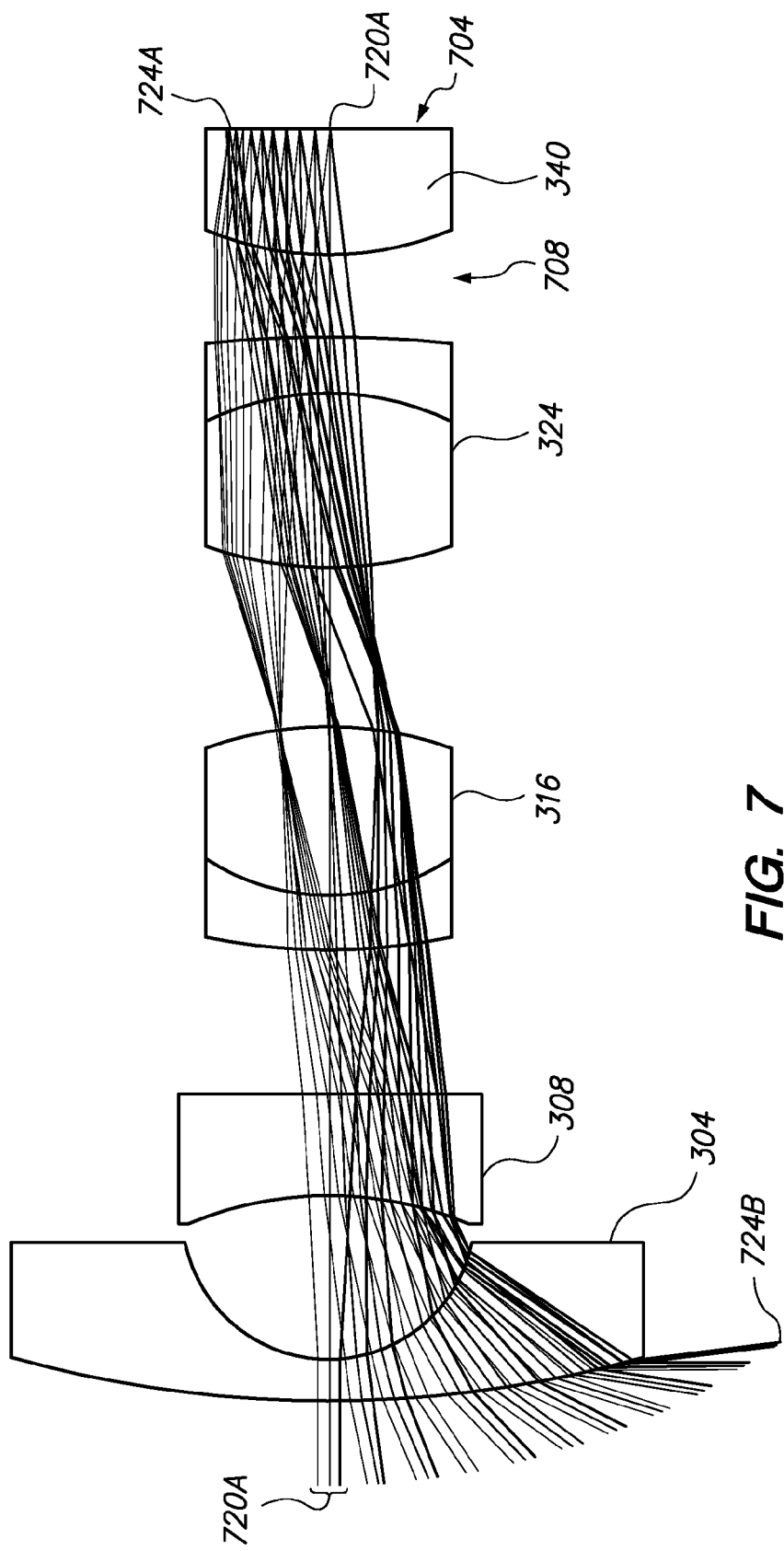
FIG. 7 illustrates on exemplary lens arrangement with resulting ray traces through the lenses.

FIG. 7 illustrates one exemplary lens arrangement with resulting ray traces through the lenses. This is but one possible arrangement of lenses and it is contemplated that one of ordinary skill in the art or those familiar with optics may arrive at different lens arrangements. In this configuration, working from the right hand side of the figure, the index-matching lens 340 receives optic signals from one or more optic signal conductors or generators, such as optic fibers, lasers, optic channels, lenses, or any other optic signal source.

A curved image plane is very inconvenient for mounting an array of optical fibers. Just like the eyepiece lens and reflective lens designs, the panoramic type lens also has the problem of wrapping around near 90 degrees from the lens center axis as angular coverage is increased. This design uses more elements to image onto a flat plane.

However, off-axis field points for those designs come into the image plane at a significant angle, as shown in FIG. 4. To get maximum light signal coupled both out of and back into the optical fibers, the optical fibers would have to be mounted at different angles across the image plane. That would make fabrication and assembly more time consuming. Therefore, preference for this design was to make the image light telecentric so that off-axis field points (or optical fibers) are normal to the image surface, such as the index matched lens 430

In this embodiment, the index-matching lens 340 has a flat surface 704 which receives the optic signal from the light source(s). By making the surface 704 flat, maximum signal transmission into the lens 340 may occur. This configuration also provides the benefit of reducing the complexity of the interface between optic fibers (not shown) and the flat surface 704 of the lens 340. As a result, angled end polishing may be eliminated. Index-matching gel (not shown) reduces any index mismatch between optic fibers and the lens 340.

Opposing the index-matching lens is a first doublet lens group 324. A focusing gap 708 is provided between lens 324 and lens 340. This focusing gap 708 may increase or decrease in length to obtain optimal focus of the optic signal through the lenses onto the inner surface shown in FIGS. 1 and 2.

Opposing the first doublet lens group 324 is a second doublet lens group 316, and then a single lens element 308, followed by the external lens element 304. In this embodiment, the external lens element 304 is a fisheye lens. Use of a fisheye lens provides the benefit of a single external lens element and an ability to project optic signals onto all locations of the internal surface of the object subject to movement measurement. For example, light signal input at point 720A passes through the shown lens elements to generate light output location 720B. The optic signal projected by the lens 304 from point 720B is projected onto the inner surface. Concurrently, with the single external lens element and using the same lens arrangement, an optic signal reflection from the inner surface is received by the fisheye lens 304 at point 720B and optically directed back into the same point 720A in the index-matching lens 340. This reflection is conveyed into the same optic signal conductor (fiber optic cable) which presented the optic signal to the lens for processing.

Likewise, an optic signal presented by a fiber optic cable to position 724A, which is at or near the edge of the index-matching lens 340, is directed through the lenses 340, 324, 316, 308, 304 to point 724B. From point 724B, the optic signal is projected onto the inner surface as shown in FIGS. 1 and 2. As can be appreciated, although the optic signals are input into the flat surface 704 at points 720A and 724B, which are only a small distance away and in the same flat plane, the projection of these optic signals occurs at vastly different angles from the lens 304. By adjusting the location that the input signal is provided on the surface 704 (see FIG. 6), the optic signal may thus be projected to any location on the inner surface of the material that is having its motion tracked due to the behavior of the fisheye lens.

Figure 8:
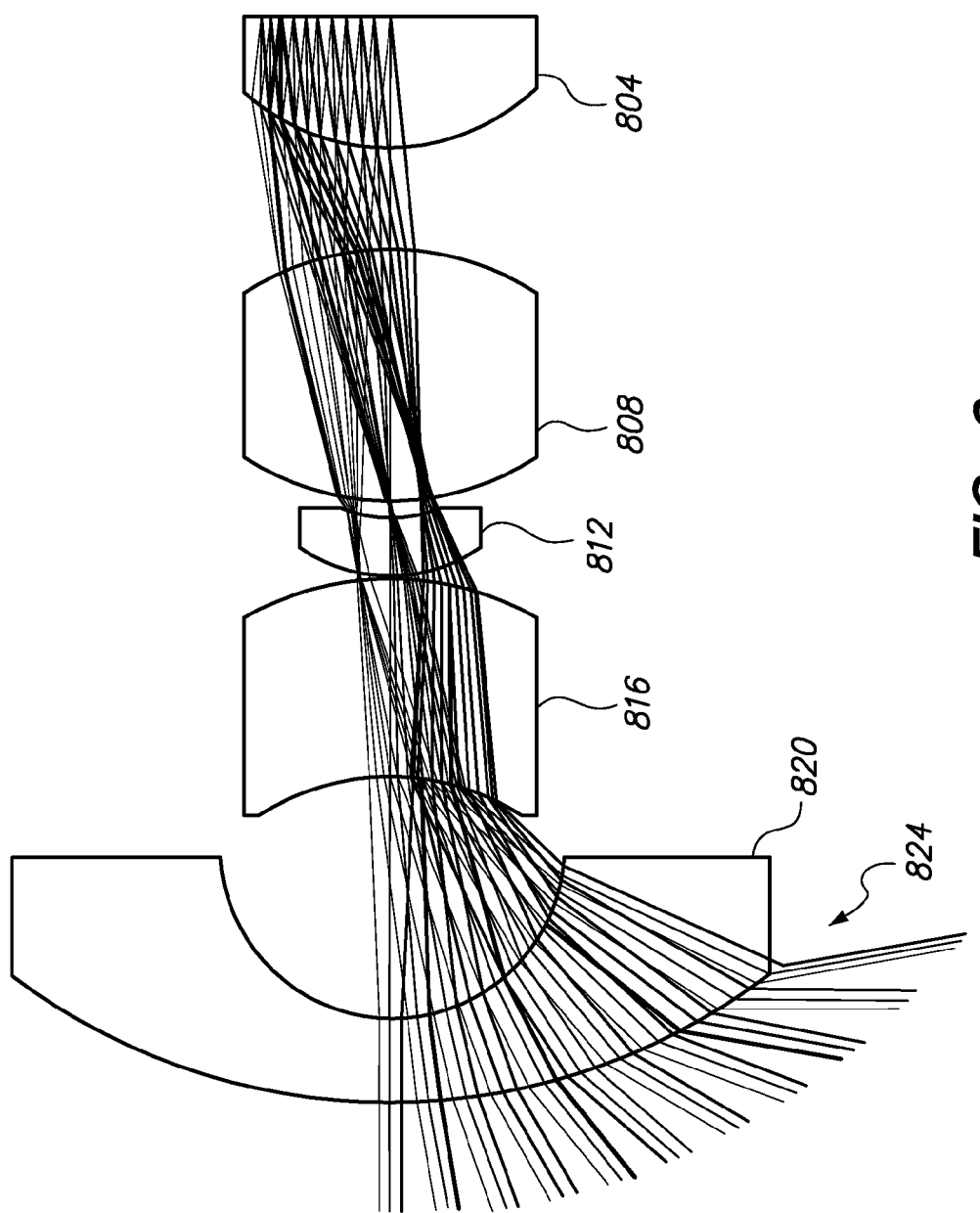
FIG. 8 illustrates an example arrangement of an alternative lens arrangement with resulting ray traces.

FIG. 8 illustrates an example arrangement of an alternative lens arrangement with resulting ray traces. The functionality of the embodiment of FIG. 8 is generally similar to the functionality of FIG. 7. As shown, an index-matching lens 804 receives the optic signals. Opposing the index-matching element are one or more lens 808, 812, 816 followed by an external lens 820, such as a fisheye lens.

As compared to the embodiment of FIG. 7, the angle 824 which the optic signals are or can be projected from the external lens 820 is greater than the embodiment of FIG. 7. This provides the benefit of greater coverage and capability to project the optic signals beyond 180 degree range and likewise, receive reflections from a greater area of the inner surface.

Figure 9:
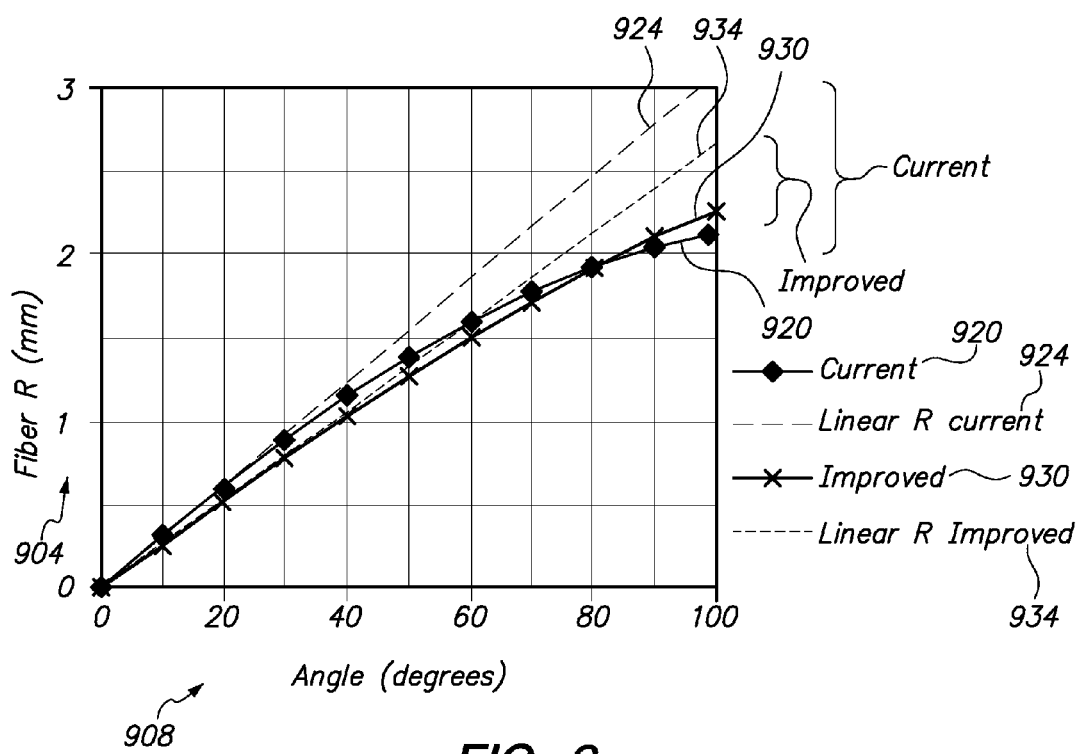
FIG. 9 illustrates a plot of distortion improvement realized in the embodiment of FIG. 8 over the embodiment of FIG. 7.

FIG. 9 illustrates a plot of distortion improvement realized in the embodiment of FIG. 8 over the embodiment of FIG. 7. This figure shows plots of the optic fiber position versus angular position in a hemisphere. In this plot, the vertical axis 904 represents fiber R value in millimeters while the horizontal axis 908 represents angle, in degrees, of distortion. The distortion is the difference between the linear fiber position and the model fiber position. The plot shows how further optimization has decreased the distortion in the improved design.

As shown, plot 920 represents current while plot 924 represents linear R for the lens arrangement of FIG. 7. The plots 920, 924 represent performance of the lens arrangement of FIG. 7. Plot 930 represents improved current. Plot 934 represents linear R for the improved lens arrangement of FIG. 8. The plots 930, 934 represent performance of the lens arrangement of FIG. 8. As can be appreciated, significant improvements are realized by the improved lens arrangement.

Example Embodiment

A series of live dynamic PDV tests within hemispherical shells were fielded using a discrete collimator multipoint ball probe, a multiple lens array probe, and a fisheye probe design (described in the next section). All three gave high-quality data during testing. The fisheye lens' performance stood out over prior art probes in several ways.

First, the fisheye element does not encroach into the center of the imploding hemisphere. This is important because experimentalists ideally want the measurement to record data until the shock wave impacts the probe. Therefore, the smaller the probe the better it will record late-time information. Second, the physical size of the waist near the center of the cavity is smaller. This helps to fit the probe through a small opening for blast mitigation. Third, angular coverage can be more complete. Fourth, the fisheye probe is easier to assemble than prior art multipoint probes.

During these tests to minimize costs, the PDV recording system was implemented using components that were obtained from the telecommunications industry. Components use light in the 1550 nm band, including CW fiber lasers, amplifiers, detectors, optical isolators, splitters, combiners, and optical fiber attenuators were selected for use. Therefore, the fisheye lens for PDV was designed for operation at the 1550 nm wavelength. Glass, such as lenses, for high transmission in this wavelength region were chosen. Some effort to reduce chromatic aberration and extend the band to visible red light was also made, but was not emphasized.

Optimization

During optimization the lens was modeled by tracing from a spherical surface through the lens to the fiber plane with all field points weighted equally. This method optimized imaging at 1550 nm from the large to the small conjugate side. Analysis was later performed with the lens model flipped to trace from the fibers to the spherical surface. An example fisheye lens was used as a starting point. Due to inherent fisheye lens barrel distortion, magnification is not constant across the field. Therefore, the numerical aperture of the outer field points was larger than that of the center field points. To address this, vignetting factors were employed so that the outer field points would not make a light cone excessively large for a standard single-mode optical fiber. As optimization progressed, and during testing, adjustments were made to the vignetting factors of these outer field points.

During optimization merit function weighting was high for the 1550 nm wavelength. Weight was also entered to make each field point normal to the image surface. A small weight was set to minimize the incident angle of light on the first surface. Glasses were initially allowed to vary, but were later fit to the model. A short lens effective focal length helped for small beam diameter channels and reduced physical size. A trade-off in the overall magnification or size of the optical fiber plane versus point-to-point resolution on the surface is made.

During assembly, the fiber ferrule and index-matching element with index-matching gel are bonded together. Index-matching epoxy did not yield as good of results as index-matching gel. After the other lenses were glued into the housing, the index-matched lens/fiber-array unit is moved to the proper distance for fine focusing of the fiber beams using an infrared camera.

Fisheye Probe Improvements

Inherently, fisheye lens images are distorted. The distortion manifests itself as pincushion distortion when going from the optic fiber plane to the curved surface and as barrel distortion when going from the curved surface to the optical fiber plane. The points at higher angles in FIGS. 7 and 8 are spread out more than those at lower angles. This change in magnification versus field angle causes elliptical optical fiber spots on the concave inner surface of FIG. 2 at high angles. It also manifests itself as a loss of efficiency for PDV signals at the higher angles. High incidence angles on lens elements at high angles may also have less effective anti-reflection coatings.

It is contemplated that further work was done to improve the fisheye lens probe's design performance. For example, global optimizations with merit functions that emphasize telecentric light at the optical fiber plane, good imaging, and minimizing magnification differences across the image field were performed to increase efficiency at the higher angles. Again, a small weight to minimize the outer surface incident angle was set.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A photonic Doppler velocimetry probe comprising
a housing defining an interior space between a first end and a second end; one or more optic signal conductors entering the housing through the second end a terminating end within the interior space of the housing, the one or more optic signal conductors configured to provide one or more optic signals to one or more lenses in the probe, the probe configured for velocimetry measurements;
a ferrule, located within the housing, having one or more passages configured to receive and secure at least one of the one or more optic signal conductors to the ferrule;
an index-matching lens having a flat surface adjacent the ferrule to receive the optic signal, the index-matching lens having an index of refraction selected to match an index of refraction of the one or more optic signal conductors;
a fish eye lens, mounted at the first end, configured to receive the optic signal and project the optic signal outward in a direction controlled by the configuration of the fish eye lens.

2. The probe of claim 1 wherein the one or more optic signal conductors are one or more optic fibers.

3. The probe of claim 2 wherein the one or more optic fibers are single mode optic fibers.

4. The probe of claim 3 wherein the terminating end of the one or more optic fibers and a side of the ferrule are end polished.

5. The probe of claim 1 further comprising index-matching material between the index-matching lens and the ferrule, the index-matching material consisting of index-matching gel or index-matching epoxy.

6. The probe of claim 1 wherein the optic signal is at 1550 nm wavelength.

7. The probe of claim 1 further comprising one or more additional lens elements between the index-matching element and the fish eye lens.

8. The probe of claim 1 wherein the fisheye lens, index-matching lens and the one or more optic signal conductors are configured to receive a reflection of the optic signal and conduct the reflection back through the optic signal conductor.

9. A photonic Doppler velocimetry probe comprising
a housing defining an interior space;
one or more optic signal conductors having a terminating end configured to provide optic signals;
an index-matching lens, located in the interior space, configured to receive the optic signals, the index-matching lens having an index of refraction selected to match an index of refraction of the one or more optic signal conductors;
a fish eye lens configured to receive the optic signals after the optic signals pass through the index-matching lens and project the optic signal outward in a direction controlled by the configuration of the fish eye lens, onto a curved surface, the curved surface being the subject of photonic Doppler velocimetry measurement.

10. The probe of claim 9 wherein the one or more optic signal conductors comprise one or more optic fibers.

11. The probe of claim 10 wherein the one or more optic fibers comprise single mode optic fibers.

12. The probe of claim 11 wherein the one or more optic signal conductors are secured by a disk having one or more passages, and the one or more optic signal conductors pass through the one or more passages and are end polished to be generally flush in with a side of the disk.

13. The probe of claim 9 further comprising index-matching gel material between the index-matching lens and the one or more optic signal conductors.

14. The probe of claim 9 wherein the optic signal is at 1550 nm wavelength.

15. The probe of claim 9 further comprising one or more additional lens elements between the index-matching element and the fish eye lens.

16. The probe of claim 9 wherein the fisheye lens, index-matching lens and the one or more one or more optic signal conductors are configured to receive a reflection of the optic signal and conduct the reflection back through the optic signal conductor.

17. A method, during photonic Doppler velocimetry, for presenting an optic signal to a curved surface and receiving a reflection from the curved surface during movement of the curved surface comprising:
establishing a distal end of a probe facing the curved surface, the distal end of the probe including a fisheye lens facing the curved surface;
generating an optic signal;
presenting the optic signal to an optic signal conductor;
passing the optic signal through the optic signal conductor to one or more lenses, the one or more lens including an index matched lens
directing the optic signal into a fisheye lens as part of velocimetry measurement of the curved surface, the fisheye lens changing the path of
the optic signal to thereby project the optic signal onto a position on the curved surface;
initiating movement of the curved surface;
receiving a reflection of the optic signal at the fisheye lens, the reflection being reflected from the curved surface;
passing the reflection through the one or more lenses to the optic signal conductor.

18. The method of claim 17 wherein the optic signal conductor is a single mode fiber optic cable.

19. The method of claim 17 wherein the reflection proceeds along the same path through the fisheye lens, the one or more lenses, and the optic signal conductor as the optic signal.

20. The method of claim 17 wherein projecting the optic signal onto a position on the curved surface includes projecting the optic signal to a plurality of locations on the curved surface.

* * * * *